United States Patent [19]

Fukinuki

[11] Patent Number: 4,660,072
[45] Date of Patent: Apr. 21, 1987

[54] TELEVISION SIGNAL TRANSMISSION SYSTEM

[75] Inventor: Takahiko Fukinuki, Kokubunji, Japan

[73] Assignee: Hitachi, Ltd., Tokyo, Japan

[21] Appl. No.: 578,528

[22] Filed: Feb. 9, 1984

[30] Foreign Application Priority Data

Mar. 18, 1983 [JP] Japan .................................. 58-44238

[51] Int. Cl.⁴ ............................................ H04N 11/14
[52] U.S. Cl. ........................................ 358/12; 358/16; 358/142
[58] Field of Search ..................... 358/11, 12, 142, 146, 358/16

[56] References Cited

U.S. PATENT DOCUMENTS 2,686,831  8/1954  Dome ..................................... 358/12
2,716,151  8/1955  Smith ..................................... 358/12
4,520,385  5/1985  Jackson et al. ......................... 358/12

FOREIGN PATENT DOCUMENTS 1333886  10/1973  United Kingdom .................. 358/31
2079091   1/1982  United Kingdom .................. 358/31
2652904   5/1978  Fed. Rep. of Germany ........ 358/12

OTHER PUBLICATIONS

E. Dubois et al., Three Dimensional Spectrum and Processing of Digital NTSC Color Signals, Digital Video No. 3, pp. 72-84, Jun. 1980.
Fukinuki, Extended Definition TV Fully Compatible with Existing Standards, IEEE Transactions on Communications vol. Com. 32, No. 8, Aug. 1984.
Fukinuki et al., Experiments on Proposed Extended Definition TV with Full NTSC Compatibility, SMPTE Journal Oct. 1984, pp. 923-929.
S. J. Auty et al., PAL Color Picture Improvement Using Simple Analog Comb Filters, SMPTE Journal vol. 87, Oct. 1978, pp. 677-681.

Primary Examiner—John W. Shepperd
Attorney, Agent, or Firm—Antonelli, Terry & Wands

[57] ABSTRACT

A television signal transmission system is improved to be able to transmit a video signal having a frequency band wider than existing transmission frequency bands while maintaining compatibility with existing television systems. On the sending side, a wide-band luminance signal is frequency-shifted and inserted into a vacant frequency spectrum of a television signal in the existing television systems before transmission.

23 Claims, 10 Drawing Figures

TELEVISION SIGNAL TRANSMISSION SYSTEM

BACKGROUND OF THE INVENTION (1) Field of the Invention

The present invention relates to a television signal transmission system, and more particularly, to a television signal transmission system in which a wide-band television video signal is transmitted in a frequency band narrower than the frequency band of the television video signal itself and is regenerated in a television receiver.

(2) Description of the Prior Art

Hitherto, the standard television signal employs a transmission frequency band which is limited according to standards; hence, there is a limit in the resolution of the picture which is reproduced from the television signal in a television receiver.

To improve the resolution of the reproduced television picture, it is necessary to widen the transmission frequency band thereby to make it possible to enlarge the frequency band for the signal. More specifically, while the signal frequency band is specified to be 4.2 MHz in the standard NTSC television system, it is necessary to transmit the television signal in a frequency band of 6.0 MHz, for example, if the resolution is to be improved.

However, such a change in the signal frequency bandwidth requires modification of all of the standard broadcasting equipment, television receivers, channel assignments and so forth. Such modifications can be made technically, but are extremely difficult to realize in actual practice.

SUMMARY OF THE INVENTION

Accordingly, it is an object of the present invention to provide a television signal transmission system which is capable of transmitting a wide-band television video signal in a frequency band narrower than the frequency band of the television video signal, thereby allowing the wide-band television video signal to be regenerated with high resolution by a television receiver.

It is another object of the present invention to provide a television signal transmission system which is capable of reproducing a picture having a quality superior in fineness to that of the picture reproduced by present television systems within the limits of existing television signal transmission standards (i.e., a system which is fully compatible with the present television systems).

To these ends, according to the invention, the arrangement is such that in a sending part of the system, a high-frequency luminance component of a television video signal is frequency-shifted to compress a required frequency band; in a transmission part of the system, the signal having the frequency bandwidth compressed is transmitted or recorded; and in a receiving part of the system, processing reverse to that in the sending part is carried out to restore the shifted high-frequency luminance component to the former frequency, thereby to regenerate the original television video signal.

In accordance with the present invention, the frequency shifting effected in the sending part of the system is performed so that the frequency-shifted high-frequency component of the luminance signal exists in a vacant frequency band in the spatio-temporal frequency domain of a television signal, in order that the low-frequency component and the frequency-shifted component of the luminance signal will not affect each other or be easily separated from each other in the receiving part.

The above-mentioned and other features and objects of this invention will become more apparent by reference to the following description taken on connection with the accompanying drawings.

DETAILED DESCRIPTION OF THE PREFERRED EMBODIMENTS

First of all, for ease of understanding, an explanation will be made concerning temporal, horizontal and vertical frequencies of television signals as used in the following description, followed by a description of the principle of the invention as it relates to the use of the three frequencies.

Figure 1:
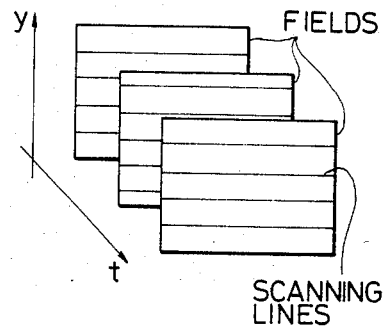
FIG. 1 schematically shows fields of a television signal.

FIG. 1 is a schematic illustration of the relationship between three consecutive fields of a television signal and the scanning lines thereof. In the drawing, a symbol t represents the time axis, while a symbol y represents the vertical scan direction.

Figure 2:
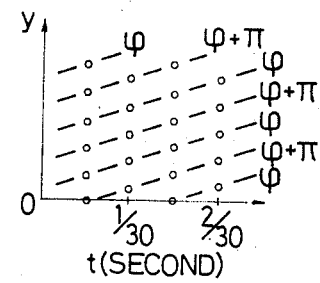
FIG. 2 shows the phases of a color subcarrier in the temporal-vertical domain.

FIG. 2 shows the relationship between the fields and the scanning lines as viewed from the left in FIG. 1. In the drawing, the small circles represent the scanning lines, respectively, as viewed in the horizontal direction in FIG. 1.

Figure 3:
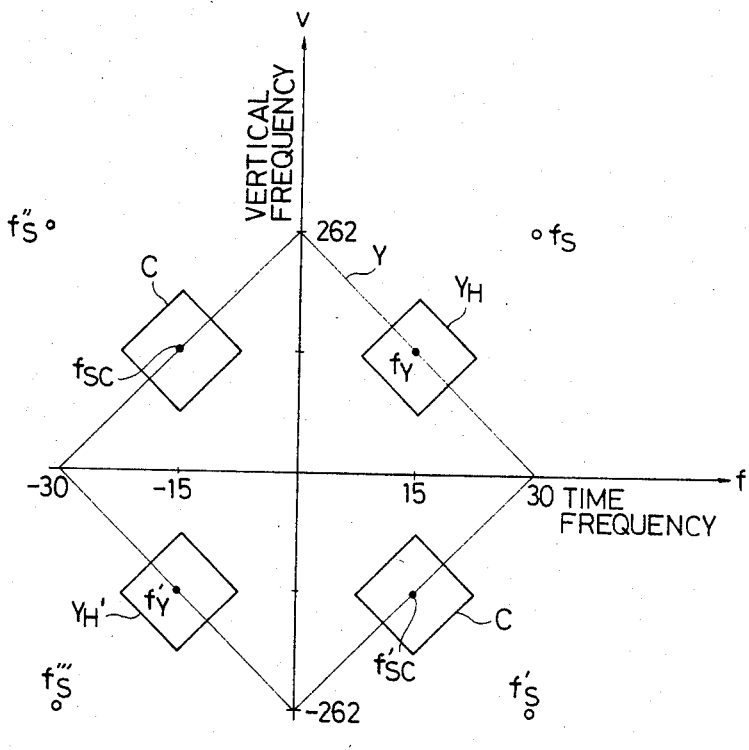
FIG. 3 shows a television signal in accordance with the invention represented by the temporal frequency f and the vertical frequency $\gamma$.
Figure 4:
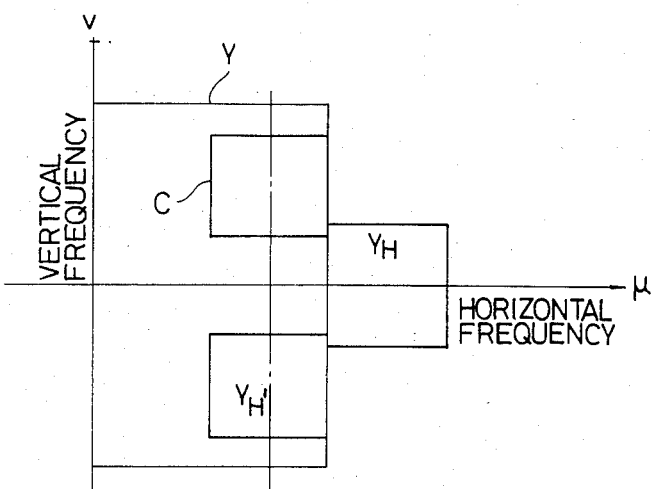
FIG. 4 shows a television signal in accordance with the invention represented by the horizontal frequency $\mu$ and the vertical frequency $\gamma$.

In the NTSC television signal, with respect to color signals, color subcarriers (3.58 MHz) are modulated by color difference signals. The luminance signal is limited in a frequency band ranging from 0 to 4.2 MHz. Moreover, the frame period is 1/30 second; one frame is constituted by two fields; and an interlaced scanning is used. The phases of the color subcarriers are related to each other as shown by $\phi$, $\phi+\pi$ in FIG. 2. FIGS. 3 and 4 show such an NTSC signal in the spatio-temporal frequency domain.

In FIG. 3, the abscissa f expresses a frequency representing the temporal change of a specific picture element (referred to as "temporal frequency", hereinafter).

Since the field period is 1/60 second, it is possible to show a change in period up to 1/60 second. On the other hand, the ordinate γ represents the spatial frequency in the vertical direction (referred to as "vertical frequency", hereinafter). Since one frame has 525 scanning lines, the maximum vertical frequency is 262. As is well known, in such an image pickup system as effecting the progressive scanning and having a pre-filter, the luminance component of a television signal can be arranged to exist in the portion contained in the diamond Y. On the other hand, the color subcarrier signals can be arranged to exist in portions contained in the small diamonds C in the second and fourth quadrants, since the color subcarriers have such phase relationship as shown in FIG. 2. Symbol $f_s$ represents the spatio-temporal sampling frequency according to interlaced scanning, as is well known. A symbol $f_{sc}$ denotes the color subcarrier frequency of the NTSC signal in the vertical-temporal frequency characteristic. Accordingly, the luminance signal exists as side bands around the frequency, $f_s$, $f_s'$, $f_s''$, $f_s'''$. Color signals, on the other hand, exist around $f_{sc}$, $f_{sc}'$ as side bands.

It should be noted that, in the first and the third quadrants, the regions which are conjugate with the regions marked "C" in the second and the fourth quadrants are vacant or not used effectively. This invention is based on the efficient utilization of these conjugate regions for the transmission of high resolution information $Y_H$. Namely, the information is frequency shifted into these regions as the information $Y'_H$. For the frequency shifting, a new sub-carrier is used, as shown in FIG. 3. This will be explained again with reference to FIG. 4.

In FIG. 4, the vertical frequency γ is plotted along the axis of ordinate, and the spatial frequency μ in the horizontal direction (referred to as "horizontal frequency", hereinafter) is plotted along the axis of abscissa. In the drawing, the region contained in a rectangle Y represents the luminance signal, while the portion contained in the small rectangle C corresponds to the color signal. The expression of these signals in the spatio-temporal frequency domain has already been known (e.g., E. Dubois, et al. "Three Dimensional Spectrum and Processing of Digital NTSC Color Signals", SMPTE (ed.) Digital Video No. 3. pp. 72–84, June 1980); hence, any more detailed description thereof is omitted.

According to the invention, a high-resolution signal, i.e., a high-frequency component of the luminance signal which is not sent by existing television signals owing to the transmission bandwidth restrictions, is frequency-shifted and then inserted into the above-mentioned unused frequency band, i.e. the conjugated regions in the spatio-temporal frequency domain before transmission or recording and is then demodulated and regenerated. More specifically, the high-resolution signal $Y_H$ in FIG. 4 is inserted into the frequency region $Y_H'$ in FIG. 4, $Y_H'$ in FIG. 3 before transmission.

Figure 5:
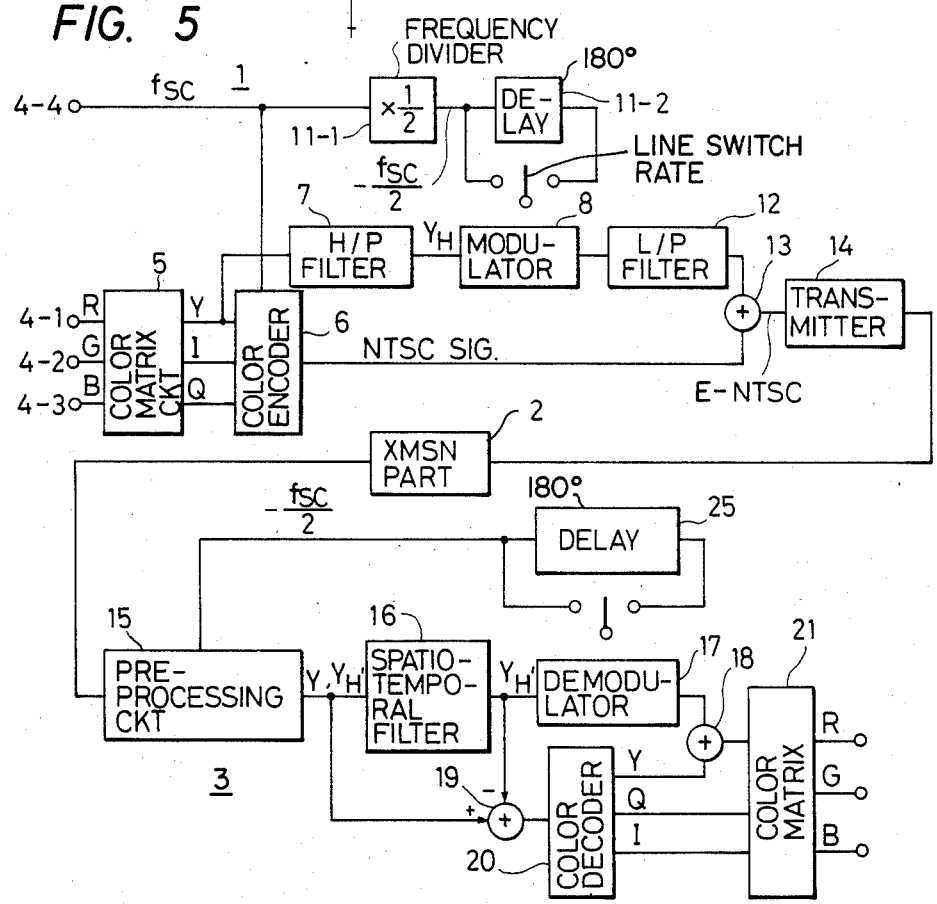
FIG. 5 is a block diagram showing the arrangement of one embodiment of the transmission system of the invention.

FIG. 5 is a block diagram showing the arrangement of one embodiment of the television signal transmission system in accordance with the invention.

In a sending part 1, wide-band color signals of red (R), green (G) and blue (B) obtained from a television camera are fed into a color matrix circuit 5 from input terminals 4-1, 4-2, 4-3, respectively, so as to be converted into a luminance signal Y and color difference signals I and Q, respectively, and are then converted into an NTSC color television signal by means of a color encoder 6. A high-pass filter 7 extracts a high-frequency component $Y_H$ (4.2 to 6 MHz) from the luminance signal Y as one of the outputs of the matrix circuit 5. A carrier signal having a frequency $f_{sc}$ (=3.58 MHz) fed from an input terminal 4-4 is passed through a frequency divider 11-1 to obtain a signal having a frequency of e.g., $\frac{1}{2}f_{sc}$, which is then fed into a modulator 8 to amplitude-modulate the high-frequency component $Y_H$. Representing the frequency of the high-frequency component $Y_H$ by $f_0$, the modulated signal has a lower-side band $f_0-\frac{1}{2}f_{sc}$ and an upper-side band $f_0+\frac{1}{2}f_{sc}$. Therefore, only one side bond, e.g., the lower-side band $f_0-\frac{1}{2}f_{sc}$ is extracted by means of a low-pass filter. The above-mentioned NTSC television signal and the lower-side band signal are fed into an adder 13 to obtain an extended NTSC signal (referred to as "E-NTSC signal, hereinafter). This E-NTSC signal, together with an audio signal, is converted by means of a transmitter 14 into a signal suitable for transmission and is then delivered to a transmission part 2. The transmission part 2 may comprise not only a space through which an electromagnetic wave is propagated but also such means as a cable or a video tape recorder.

In the construction of the sending part a, the portion for obtaining the E-NTSC signal is similar to that conventionally known.

Figure 6:
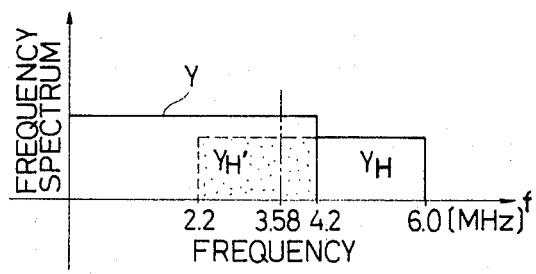
FIG. 6 is a spectrum chart of a television signal for describing the operation of the embodiment shown in FIG. 5.

FIG. 6 shows the signal spectrum relation in various portions in the sending part. The signal from the television camera includes the high-frequency component (4.2 to 6.0 MHz) in addition to the ordinary luminance signal Y (0 to 4.2 MHz). The high-frequency component $Y_H$ is extracted by means of the high-pass filter 7 and then passed through the modulator 8 and the low-pass filter 12 to obtain a signal $Y_H'$ having a frequency, $f_0-\frac{1}{2}f_{sc}$, through frequency shifting. As a consequence, the signal $Y_H'$ (2.2 to 4.2 MHz) has the spectrum in the dashed line area provided with dots in FIG. 6.

Figure 7:
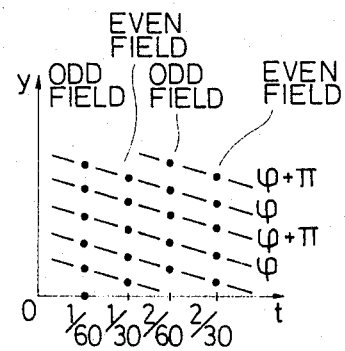
FIG. 7 shows the phases of carriers employed for frequency shifting.

Although the signal $Y_H'$ overlaps the frequency of the carrier color signal including a color subcarrier frequency, 3.58 MHz, the signal $Y_H'$ exists in an unused region in the spatio-temporal frequency domain as explained with reference to FIGS. 1 and 2. Therefore, the arrangement is such that the carrier $\frac{1}{2}f_{sc}$ is fed into the modulator 8 by changing over the input/output of a phase shifter 11-2 for example every scanning line. FIG. 7 shows an idealized relationship of the phases of the carriers which corresponds to that shown in FIG. 2. This is expressed in the spatio-temporal frequency domain as shown by $f_Y'$, $f_Y$ of FIG. 3. For example, the phase shifting amount of the phase-shifter 11-2 may be 180°.

A receiving part 3 receives the signal from the transmission part and regenerates the original video signal by processing reverse to that in the sending part. More specifically, a pre-processing circuit 15 performs amplification, the separation of the video signal and the separation of the synchronizing signal similarly to ordinary television receivers. The separated video signal is fed into a spatio-temporal filter 16, where the high-resolution information $Y_H'$ is separated and extracted (the spatio-temporal filter will be described later). The separated signal $Y_H'$ is fed into a demodulator 17, which effects a synchronous detection using a carrier signal equal (in both frequency and phase) to the carrier signal of $\frac{1}{2}f_{sc}$ employed in the modulator on the sending side, thereby to frequency-shift the signal having a frequency, $f_0-\frac{1}{2}f_{sc}$, to a signal having a frequency, $f_0$, which is defined as a high-resolution signal $Y_H$. In an adder 19, on the other hand, the separated high-definition signal $Y_H'$ is subtracted from the separated video signal. As a consequence, the output of the adder 19 is a signal similar to the ordinary NTSC television signal. The output of the adder 19 is fed into a color decoder 20 similar to a conventionally known decoder so as to be converted into a luminance signal Y and color difference signals I and Q. The luminance signal Y and the high-definition signal $Y_H$ are added together in an adder 18, thereby to regenerate a wide-band luminance signal. On the other hand, these luminance and color difference signals I and Q are fed into a color matrix circuit 21 so as to be converted into color signals R, G, B to be fed to a color cathode-ray tube.

Figure 8A:
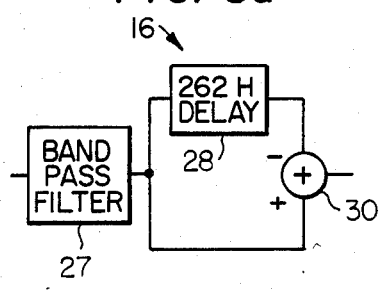
FIG. 8a is a schematic diagram of one example of the spatio-temporal filter used in FIG. 5.

FIG. 8a shows an example of the spatio-temporal filter 16 used in the receiving part 3 of FIG. 5. A band-pass filter having a passband of 2.2 to 4.2 MHz extracts the portion of the frequency shifted luminance signal which falls within this passband. The extracted signal is passed through a delay member 28 having a delay of 262H, and the difference between the input and output of the delay member 28 is obtained by a subtractor 30. Since the color signals and the luminance signal component $Y_H'$ are in phase, the component $Y_H'$ is obtained at the output of the subtractor 30.

Figure 8B:
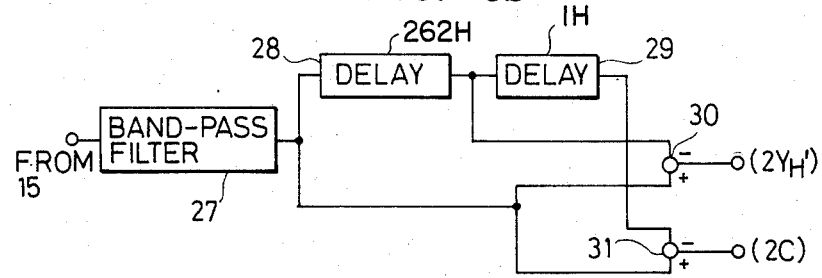
FIG. 8b shows another arrangement of a spatio-temporal filter and a part of the color decoder employed by the invention.

FIG. 8b is a circuit diagram showing an example of the spatio-temporal filter 16 and part of the color decoder 20. First of all, in the same manner described above, by a band pass filter 27 whose passband is the frequency band (2.2 to 4.2 MHz) of the frequency-shifted luminance signal $Y_H'$, a signal in the above-mentioned frequency band is extracted. The extracted signal is passed through a delay member 28 having a delay of 262H and a delay member 29 having a delay of 1H (H represents one horizontal scanning line period). The difference between the input and output of the delay member 28 is obtained in a subtractor 30. Since the color signals are in-phase while the luminance signal component $Y_H'$ is of opposite phase, as will be clear from FIGS. 2 and 7 described hereinbefore, as the output of the subtracter 30 only the luminance signal component $Y_H'$ can be separately taken out. Similarly, color signal components C are separately obtained from the subtractor 31.

Figure 9:
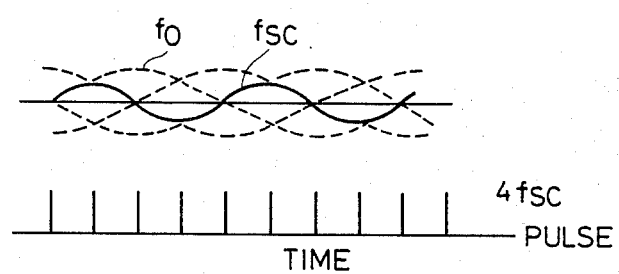
FIG. 9 is a waveform diagram showing the relationship between a color subcarrier and a reference signal for frequency shifting.

In the above-described embodiment, in order that the frequency-shifted signal $Y_H$ has the spatio-temporal relation shown in FIG. 3 and is correctly separated on the receiving side, the carriers, $f_{sc}/2$, in the sending part and the receiving part, respectively, must be synchronous with each other. The carrier, $f_{sc}/2$, is obtained simply by frequency-dividing the color subcarrier so that its frequency will be halved. In dividing the frequency, four uncertainties are produced as shown in FIG. 9, i.e., there can be four ways of existence of the frequency, $f_{sc}/2$, as shown by dotted lines, respectively, with respect to the frequency, $f_{sc}$, shown by a solid line. The employed frequency can be readily discriminated therefrom at the receiving part by directly inserting this signal $f_{sc}/2$ in the vertical synchronization portion or the like as a burst signal at the sending part or from the scanning line number obtained from the vertical synchronizing signal.

In practice, if it is intended to effect the internal signal processing by means of a clock having a frequency four times as high as the color subcarrier $f_{sc}$, i.e., 4 $f_{sc}$, for example, such pulses are generated as illustrated in FIG. 9, and it is only necessary to specify one of the pulses which is in a proper phase. Accordingly, in addition to the above-mentioned method in which the signal having a frequency, $f_{sc}/2$, is directly inserted, there are various methods, for example, the insertion of a digital signal.

Although the invention has been described through one embodiment of the television signal transmission system, it is to be noted here that the above-described embodiment is not exclusive and the following forms are, of course, included in the scope of the invention:

(i) Although the embodiment of the invention has been described with reference to the case of the NTSC signal, in the case of the PAL signal, it is similarly possible to insert a high-resolution luminance signal in a three-dimensional vacant frequency band. More specifically, it is only required to utilize subcarriers with respect to high-resolution information.

Moreover, through the utilization of the fact that there are two vacant frequency bands, it is also possible to insert 5.5 to 8 MHz into $Y_H$ and 8 to 10.5 MHz into $Y_{H'}$.

(ii) It is, as a matter of course, possible to employ the technique of the invention in combination with a technique in which the number of scanning lines is doubled at the receiving part and the interlaced scanning is converted into progressive scanning as a technique for eliminating the imperfections of the interlaced scanning thereby to obtain a high resolution also in the vertical direction, or a method in which the number of scanning lines is increased by means of a proper interpolation may be adopted. Moreover, the invention may be combined with a technique in which the original video signal is obtained on the picture sending side by means of progressive scanning and is converted into an interlaced scanning signal by means of a proper filtering and subsampling (e.g., K. Lucas, "Standards for Broadcasting Satellite Services", IBA Technical Review, No. 18, March 1982).

(iii) The circuit for separating the high-resolution luminance signal and the color signals shown in FIG. 8b is only an example, and it is also possible to pass the output of this circuit through a subsequent circuit according to need. More specifically, it is useful for improvement in characteristics to pass the output of the above-mentioned circuit through a filter that obtains the difference between the frames through the utilization of the fact that the phase changes in every frame, or through a filter that obtains the difference between the scanning lines through the utilization of the fact that the phase changes in every scanning line in the same field.

(iv) With respect to the color difference signals and the high-resolution luminance signal, it is desirable to limit the bands of the vertical and temporal frequencies beforehand. To limit the vertical frequency, it is known to add the outputs by the use of a horizontal period delay line. Also the temporal frequency can be limited simply by replacing the delay line with a frame delay element. On the other hand, with respect to the luminance signal in connection with the frequency band of 2.2 to 4.2 MHz where color and other signals are superposed, it is preferable to previously eliminate components thereof in the vicinity of the frequency band corresponding to f=15 Hz and $\gamma=131$ scanning line.

(v) In the frequency band where color and high-resolution luminance signals are superposed, it is preferable to eliminate base band luminance signal components beforehand.

(vi) An example of the arrangement of the filter for extracting the color and high-frequency luminance signals has been illustrated in FIG. 8b. This is, however, not exclusive and various methods are available. Here, only luminance signals will be mentioned hereinunder.

$(1-Z_{-262H}).(BPF)$ $(1-Z^{-262H}).(BPF).(-1+2Z^{-1}Z^{-2})/4$ $(1-Z^{-262H}).(BPF).(1-Z^{-525H})$ $(1+Z_{-263H}).(BPF).(1-Z^{-525H})$

Alternately, a combination of these luminance signals may be employed.

In the case of color signals, it is only necessary to interchange 262H and 263H with each other as will be clear from the disposition in FIG. 3.

(vii) The filter for obtaining the sum of or difference between the fields is improved in characteristics by means of a modification as follows, for example, as is well known from the arrangement of a digital filter. That is, instead of $1-Z^{-263H}$, $-1+2Z^{-263H}-Z^{-526H}$ is employed.

According to the invention, high-resolution information is inserted in three-dimensional vacant frequency bands, thereby allowing high-resolution video information to be advantageously transmitted within the limits placed by the existing television signal standards.

More specifically, by inserting a high-resolution luminance signal of 6 MHz, for example, into the signal frequency band of 4.2 MHz, a high-resolution television signal can be transmitted without modifying the existing broadcasting standards and the like.

Moreover, it becomes possible to display a high-resolution television picture while maintaining communicability by combining the technique of the invention with a technique of doubling the number of scanning lines on both the sending part and the receiving part or only the receiving part, or a technique of converting interlaced scanning into progressive scanning, thereby to increase the resolution in both horizontal and vertical directions.

What is claimed is:

1. Method for generating a color television signal comprising:
    (a) a first step of providing a luminance signal and a color signal of a video signal;
    (b) a second step of modulating a first subcarrier by said color signal in order to obtain a modulated color signal;
    (c) a third step of modulating a second subcarrier by one part of said luminance signal to obtain a modulated luminance signal; and
    (d) a fourth step of multiplexing another part of said luminance signal, said modulated color signal and said modulated luminance signal;
wherein the phase of at least said first subcarrier changes by substantially 180° every scanning line of said television signal, the phase of said first subcarrier on a current scanning line being substantially equal to that of said first subcarrier on a scanning line located just over said current scanning line and delayed by about one field period from said current scanning line, the phase of said second subcarrier on said current scanning line being substantially 180° out of phase to that of said second subcarrier on a scanning line just over said current scanning line and delayed by about one field period.

2. Method according to claim 1, wherein said modulated color signal and said another part of said luminance signal form a video signal of the NTSC color television system.

3. A color television signal generating apparatus comprising:
    (a) first means for obtaining a luminance signal and a color signal of a video signal;
    (b) first modulating means for modulating a first subcarrier by said color signal in order to obtain a modulated color signal;
    (c) second modulating means for modulating a second subcarrier by one part of said luminance signal to obtain a modulated luminance signal; and
    (d) multiplexing means for multiplexing another part of said luminance signal, said modulated color signal and said modulated luminance signal;
wherein the phase of at least said first subcarrier changes by substantially 180° every scanning line of said television signal, the phase of said first subcarrier on a current scanning line being substantially equal to that of said first subcarrier on a scanning line located just over said current scanning line and delayed by about one field period from said current scanning line, the phase of said second subcarrier on said current scanning line being substantially 180° out of phase to that of said second subcarrier on a scanning line just over said current scanning line and delayed by about one field period.

4. A color television signal generating apparatus according to claim 3, wherein said luminance signal includes another part of said luminance signal having a horizontal frequency which is lower than a predetermined horizontal frequency and said one part of said luminance signal having a horizontal frequency which is higher than said predetermined frequency, and said first means includes third means for extracting said one part of said luminance signal.

5. A color television signal generating apparatus according to claim 4, wherein said second modulating means includes a first modulator for modulating said second subcarrier by said one part of said luminance signal, and a low pass filter for passing one side band of the output signal of said first modulator.

6. A color television generating apparatus according to claim 5, wherein said first modulator includes second subcarrier generating means having a frequency divider for dividing the frequency of said first subcarrier by one half, a phase shifter for shifting the phase of the output signal of said frequency divider by 180°, and switching means for alternately outputting an input signal and an output signal of said phase shifter.

7. A color television signal generating apparatus according to claim 6, wherein said another part of said luminance signal and a modulated color signal form a video signal of the NTSC color television system.

8. A television signal transmission system comprising:
    (a) sending means including means for modulating a first subcarrier by a color signal in order to obtain a modulated color signal and means for modulating a second subcarrier by one part of a luminance signal having a frequency higher than a predetermined frequency to convert the one part of said luminance signal into a television signal having a frequency lower than said predetermined frequency;
    (b) transmission means for transmitting at least said signal having a frequency lower than said predetermined frequency; and
    (c) receiving means for demodulating the luminance signal having a frequency higher than the predetermined frequency through processing reverse to the modulation carried out in the sending means;

wherein the means for modulating said second subcarrier by said one part of said luminance signal and the means for modulating said first subcarrier by said color signal enable modulation so that the phase of at least said first subcarrier changes by substantially 180° every scanning line of said television signal, the phase of said first subcarrier on a current scanning line being substantially equal to that of said first subcarrier on a scanning line located just over said current scanning line and delayed by about one field period from said current scanning line, the phase of said second subcarrier on said current scanning line being substantially 180° out of phase to that of said second subcarrier on a scanning line just over said current scanning line and delayed about one field period.

9. A color television signal transmission system according to claim 8, wherein said means for modulating said second subcarrier by said one part of said luminance signal includes a filter for extracting one part of said luminance signal having a frequency higher than said predetermined frequency, a modulator for amplitude-modulating the output of said filter by said second subcarrier; and a filter for extracting one of the side bands of the output of said modulator.

10. A television signal transmission system according to claim 9, wherein said television signal is an NTSC television signal and said second subcarrier has a frequency which is ½ of that of said first subcarrier.

11. A television signal transmission system according to claim 8, wherein said receiving means for demodulating the luminance signal includes a spatio-temporal filter that separates and extracts said modulated signal, and means for detecting the output of said spatio-temporal filter.

12. A television signal transmission system according to claim 1, wherein said television signal is NTSC signal, and said spatio-temporal filter includes a band pass filter that passes any signal in the frequency band of said modulated signal, a delay member that delays the output of said band-pass filter by 262H (H represents one horizontal scanning period), and a subtractor for obtaining the difference between the input and output of said delay member.

13. Method for reproducing a luminance signal and a color signal from a color television signal, comprising the steps of:
  (a) providing said color television signal including a modulated color signal obtained by modulating a first subcarrier, a modulated information signal obtained by modulating a second subcarrier and a luminance signal; and
  (b) demodulating to obtain one part of said luminance signal and a color signal;
wherein the phase of at least said first subcarrier changes by substantially 180° every scanning line of said television signal, the phase of said first subcarrier on a current scanning line being substantially equal to that of said first subcarrier on a scanning line located just cover said current scanning line and delayed by about one field period from said current scanning line, the phase of said second subcarrier on said current scanning line being substantially 180° out of phase to that of said second subcarrier on a scanning line just over said current scanning line and delayed by about one field period.

14. Method according to claim 13, wherein said luminance signal includes one part of said luminance signal having a frequency higher than a predetermined horizontal frequency and another part of said luminance signal having a frequency lower than said predetermined horizontal frequency.

15. Method according to claim 14, wherein said another part of said luminance signal and said modulated color signal form a video signal of the NTSC color television system.

16. A color television receiver comprising:
  (a) signal receiving means for receiving a received color television signal including a modulated color signal having a first subcarrier, a modulated luminance signal having a second subcarrier, and a first luminance signal having a horizontal frequency lower than a predetermined horizontal frequency;
  (b) means for separating said modulated luminance signal from said color television signal;
  (c) demodulating means for demodulating said modulated luminance signal to obtain a second luminance signal; and
  (d) means for separating and demodulating said modulated color signal from said color television signal to obtain a color signal;
wherein the phase of at least said first subcarrier changes by substantially 180° every scanning line of said television signal, the phase of said first subcarrier on a current scanning line being substantially equal to that of said first subcarrier on a scanning line located just over said current scanning line and delayed by about one field period from said current scanning line, the phase of said second subcarrier on said current scanning line being substantially 180° out of phase to that of said subcarrier on a scanning line just over said current scanning line and delayed by about one field period.

17. A color television receiver according to claim 16, further comprising means for multiplexing said first and second luminance signals to obtain a luminance signal.

18. A color television receiver according to claim 17, wherein said separating means includes a band pass filter and a spatio-temporal filter, said band pass filter passing said modulated luminance signal and said modulated color signal.

19. A color television receiver according to claim 18, wherein said spatio-temporal filter includes delay means for delaying a signal about one field period of the television signal, at which the phases of the input and output signal are in phase or out of phase by 180° with respect to said modulated luminance signal, and operating means for obtaining the sum of difference of said input and output signals of said delay means so as to derive only said modulated luminance signal.

20. A color television receiver according to claim 9, wherein said modulated color signal is the same as that of the NTSC color television system, said delay means producing delay of 262 scanning lines, and said operating means is a subtractor producing the difference of said input and output signal of said delay means.

21. A color television receiver according to claim 16, wherein said demodulating means includes:
  (a) means for producing a signal having the same frequency as that of said second subcarrier;
  (b) a phase shifter for shifting the phase of the input signal of said signal detecting means by 180°;
  (c) switching means for alternately outputing an input signal and an output signal of said phase shifter; and
  (d) demodulator means for demodulating said modulated luminance signal using the output signal of said switching means.

22. A color television receiver according to claim 16, wherein said modulated color signal, and said first luminance signal are the same as a luminance signal and a modulated color signal of the NTSC color television system.

23. A color television receiver according to claim 22, wherein said separating means includes a bandpass filter and a spatio-temporal filter connected in series, said bandpass filter passing said modulated luminance signal and said modulated color signal, and another demodulating means is formed by a color decoder connected to receive a signal obtained by subtracting the output signal of said spatio-temporal filter from the output signal of said receiving means.

* * * * *